(12) United States Patent
Hayashi et al.

(10) Patent No.: US 8,605,192 B2
(45) Date of Patent: Dec. 10, 2013

(54) IMAGING APPARATUS AND ELECTRONIC DEVICE INCLUDING AN IMAGING APPARATUS

(75) Inventors: Yusuke Hayashi, Tokyo (JP); Naoto Ohara, Tokyo (JP); Tomoya Sugita, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 576 days.

(21) Appl. No.: 12/744,890

(22) PCT Filed: Nov. 28, 2008

(86) PCT No.: PCT/JP2008/071656
§ 371 (c)(1),
(2), (4) Date: Jul. 21, 2010

(87) PCT Pub. No.: WO2009/069752
PCT Pub. Date: Jun. 4, 2009

(65) Prior Publication Data
US 2010/0302412 A1 Dec. 2, 2010

(30) Foreign Application Priority Data

Nov. 29, 2007 (JP) ................................ 2007-309548
Dec. 27, 2007 (JP) ................................ 2007-338238
Mar. 27, 2008 (JP) ................................ 2008-084329

(51) Int. Cl.
*H04N 5/225* (2006.01)
*H04N 5/217* (2011.01)

(52) U.S. Cl.
USPC .. 348/335; 348/241; 348/208.11; 348/333.08

(58) Field of Classification Search
USPC ......... 348/208.11, 204.1, 240.3, 259, 333.08, 348/335
See application file for complete search history.

(56) References Cited

U.S. PATENT DOCUMENTS

| 5,270,825 | A | | 12/1993 | Takasugi et al. |
| 5,748,371 | A | * | 5/1998 | Cathey et al. ................. 359/558 |
| 6,021,005 | A | | 2/2000 | Cathey, Jr. et al. |
| 6,069,738 | A | | 5/2000 | Cathey, Jr. et al. |

(Continued)

FOREIGN PATENT DOCUMENTS

| JP | H11-500235 A | 1/1999 |
| JP | 2002-513951 A | 5/2002 |

(Continued)

OTHER PUBLICATIONS

Extended European Search Report dated Nov. 29, 2010 issued by the European Patent Office for the corresponding European Patent Application No. EP 08 85 3458.1.

(Continued)

*Primary Examiner* — Hung Lam
(74) *Attorney, Agent, or Firm* — Procopio, Cory, Hargreaves & Savitch LLP

(57) ABSTRACT

An imaging apparatus includes an aberration control optical system having an aberration control function to intentionally generate an aberration and an imaging device; and an image processing device which forms a first image into a highly accurate final image. An aberration control optical system makes the PSF to cover two or more pixels by using the aberration control optical system containing an aberration control element having an aberration control function to intentionally generate an aberration or an aberration control plane having the aberration control function. The aberration control optical system is formed as a depth extension optical system having two or more peaks of the MTF characteristic for defocus in a main image plane shift region not causing a false resolution in a predetermined frequency.

14 Claims, 16 Drawing Sheets

STATE OF LIGHT BEAMS BY OPTICAL SYSTEM

(56) References Cited

U.S. PATENT DOCUMENTS

| | | | |
|---|---|---|---|
| 6,118,592 A * | 9/2000 | Kohno et al. | 359/686 |
| 6,142,630 A * | 11/2000 | Koester | 351/219 |
| 6,241,656 B1 | 6/2001 | Suga | |
| 6,356,399 B1 * | 3/2002 | Haga et al. | 359/800 |
| 6,525,302 B2 | 2/2003 | Dowski, Jr. et al. | |
| 6,642,504 B2 | 11/2003 | Cathey, Jr. | |
| 7,218,448 B1 | 5/2007 | Cathey, Jr. et al. | |
| 2004/0004766 A1* | 1/2004 | Dowski, Jr. | 359/558 |
| 2004/0190762 A1* | 9/2004 | Dowski et al. | 382/128 |
| 2006/0164736 A1* | 7/2006 | Olmstead et al. | 359/793 |
| 2007/0247725 A1* | 10/2007 | Dowski et al. | 359/676 |
| 2007/0268376 A1* | 11/2007 | Yoshikawa et al. | 348/222.1 |
| 2008/0074507 A1* | 3/2008 | Ohara et al. | 348/222.1 |
| 2011/0001858 A1* | 1/2011 | Shintani et al. | 348/294 |
| 2011/0268868 A1* | 11/2011 | Dowski et al. | 427/8 |

FOREIGN PATENT DOCUMENTS

| | | |
|---|---|---|
| JP | 2003-235794 | 8/2003 |
| JP | 2004-153497 | 5/2004 |
| JP | 2006-519527 A | 8/2006 |
| JP | 2007-060647 | 3/2007 |
| JP | 2007-300208 | 11/2007 |
| JP | 2009-122514 A | 6/2009 |
| JP | 2009-125469 A | 6/2009 |

OTHER PUBLICATIONS

Edward R. Dowski, Jr, Robert H. Cormack, Scott D. Sarama, Wavefront Coding: jointly optimized optical and digital imaging systems, CDM Optics, Inc., Army Research Laboratory.

Edward R, Dowski, Jr., Gregory E. Johnson, Wavefront Coding: A modern method of achieving high performance and/or low cost imaging systems, CDM Optics, Inc.

PCT/JP2008/071656, International Search Report, ISA/Japan, Jan. 5, 2009.

Notice of Reasons for Rejection dated May 22, 2012, issued in counterpart Japanese Application No. 2009-543873.

* cited by examiner

← 122

▶ J A N

← 123

CODE49

← 123

QR CODE

CASE WHERE ABERRATION CONTROL PLANE IS ADJACENT TO STOP

POINT IMAGE × PSF = BLURRED IMAGE

PSF ON SENSOR IN
USUAL OPTICAL SYSTEM

PSF ON SENSOR IN ABERRATION
CONTROL OPTICAL SYSTEM

RELATIONSHIPS BETWEEN SENSOR AND PSF
(WHEN SENSOR IS FIXED)

POINT IMAGE × PSF = BLURRED IMAGE

IMAGE SIZE>PSF SIZE

IMAGE SIZE<PSF SIZE

RELATIONSHIPS BETWEEN SENSOR AND PSF
(WHEN ABERRATION CONTROL OPTICAL SYSTEM IS FIXED)

DEFOCUS MTF OF USUAL OPTICAL SYSTEM

DEFOCUS MTF HAVING TWO PEAKS

DEFOCUS MTF EXTENDING ONE PEAK

ABERRATION CONTROL OPTICAL SYSTEM SUPPRESSING
OTF FLUCTUATION OF HIGH FREQUENCY

50LP/mm

100LP/mm

ABERRATION CONTROL OPTICAL SYSTEM SUPPRESSING
OTF FLUCTUATION OF LOW FREQUENCY

50LP/mm

100LP/mm

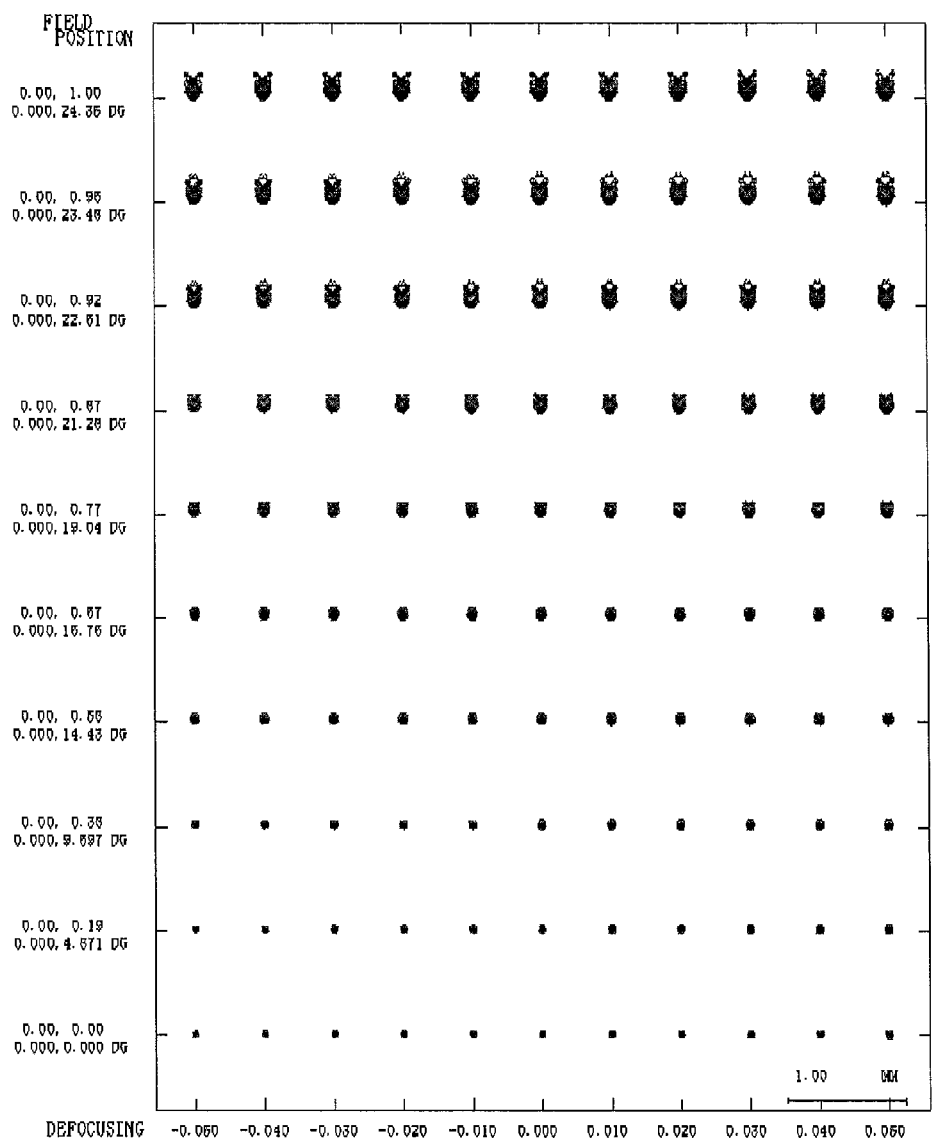

IMAGING APPARATUS AND ELECTRONIC DEVICE INCLUDING AN IMAGING APPARATUS

TECHNICAL FIELD

The present invention relates to an imaging apparatus and an electronic device using an imaging element and having an optical system

BACKGROUND ART

In recent years, rapid advances have been made in digitalization of information. This has led to remarkable efforts to meet with this in the imaging field.

In particular, as symbolized by the digital camera, in the imaging surfaces, the conventional film is being taken over by use of solid-state imaging devices such as CCDs (Charge Coupled Devices) or CMOS (Complementary Metal Oxide Semiconductor) sensors in most cases.

An imaging lens apparatus using a CCD or CMOS sensor for the imaging device in this way optically captures the image of an object by the optical system and extracts the image as an electric signal by the imaging device.

Other than a digital still camera, this type of imaging lens apparatus is used in a video camera, a digital video unit, a personal computer, a mobile phone, a personal digital assistant (PDA), an image inspection system, an automatic control use industrial camera, and so on.

FIG. 1 is a view schematically showing the configuration of a general imaging lens apparatus and a state of light beams.

This imaging lens apparatus 1 has an optical system 2 and a CCD or CMOS sensor or other imaging device 3.

The optical system includes object side lenses 21 and 22, a stop 23, and a joining lens 24 sequentially arranged from the object side (OBJS) toward the imaging device 3 side.

In the imaging lens device 1, as shown in FIG. 1, the best focus plane is made to match with the imaging device surface.

FIG. 2A to FIG. 2C show spot images on a light receiving surface of the imaging device 3 of the imaging lens apparatus 1.

Further, imaging apparatuses using phase plates to regularly disperse the light beams, using digital processing to restore the image, and thereby enabling capture of an image having a deep depth of field and so on have been proposed (see for example Non Patent Documents 1 and 2 and Patent Documents 1 to 5).

Further, an automatic exposure control system of a digital camera performing filter processing using a transfer function has been proposed (see for example Patent Document 6).

Further, in CCDs, CMOS's, and other devices having image input functions, it would often be extremely useful to read barcodes and other close still images together with a scene or other desired image.

For reading a barcode, for example, the technique of focusing by auto-focus moving the lens outward as a first example and a technique of depth extension as a second example reducing the F value in a camera to extend the depth of field and fix the focus are known.

Non Patent Document 1: "Wavefront Coding; jointly optimized optical and digital imaging systems", Edward R. Dowski, Jr., Robert H. Cormack, Scott D. Sarama.

Non Patent Document 2: "Wavefront Coding; A modern method of achieving high performance and/or low cost imaging systems", Edward R. Dowski, Jr., Gregory E. Johnson.

Patent Document 1: U.S. Pat. No. 6,021,005

Patent Document 2: U.S. Pat. No. 6,642,504

Patent Document 3: U.S. Pat. No. 6,525,302

Patent Document 4: U.S. Pat. No. 6,069,738

Patent Document 5: Japanese Patent Publication (A) No. 2003-235794

Patent Document 6: Japanese Patent Publication (A) No. 2004-153497

DISCLOSURE OF INVENTION

Technical Problem

All of the imaging devices proposed in the Document explained above are predicated on a PSF (Point-Spread-Function) being constant without regard as to the object distance when inserting the above phase plate in a usual optical system. As a result, if the PSF changes, it is extremely difficult to realize an image having a deep depth of field by subsequent convolution using the kernels.

Accordingly, leaving aside the case of lenses with a single focal point, in lenses of a zoom system, AF system, or the like, a high level of precision of the optical design is required. The accompanying increase in costs causes a major problem in adoption of this.

In other words, in a conventional imaging apparatus, suitable convolution processing is not possible. Optical design eliminating astigmatism, coma aberration, zoom chromatic aberration, and other aberration causing deviation of the spot image at the time of the "wide" mode and at the time of the "tele" mode is required.

However, optical design eliminating these aberrations increases the difficulty of the optical design and causes problems such as an increase of the number of design processes, an increase of the costs, and an increase in size of the lenses.

Further, in the above techniques, the results of restoration of images after image restoration processing become worse as images become out-of-focus.

If the optical transfer function (OTF) at the time of an out-of-focus state is constant, good restoration results are obtained, but the OTF deteriorates as an actual problem. Then, even when the restoration processing is carried out, the image is not completely restored in the process of blur restoration.

For this reason, it is difficult to obtain good restored images.

Namely, in the techniques explained above, the problems arise of noise and increase of costs along with image processing predicated on image restoration processing. Further, in the restoration processing, the OTF must not depend upon the object distance, therefore an optical system with a constant OTF even in the out-of-focus state must be designed.

Further, the above proposed phase modulation element has the effect of making the change of the modulation transfer function (MTF) with respect to the object distance small. However, the values of MTF uniformly become low.

By applying image processing for focus restoration to this, a depth extension effect can be obtained.

Accordingly, the image quality becomes greatly deteriorated unless image processing for focus restoration is applied.

The present invention provides an imaging apparatus and an electronic device able to simplify the optical system and able to reduce the costs, of course, and also enabling extension of the depth even without restoration processing, able to impart sufficient performance with respect to the desired object distance, and capable of obtaining good images with a suitable image quality and small influence of noise.

Technical Solution

An imaging apparatus of a first aspect of the present invention has an aberration control optical system including a lens and an aberration control part having an aberration control function of generating aberration and an imaging device capturing an image of an object passed through the aberration control optical system, wherein a point spread function (PSF) in the imaging device covers two or more pixels by the aberration control function.

Preferably, the aberration control function includes a function of generating spherical aberration and extending the depth.

Preferably, it includes two or more peaks in a main image plane shift area at any frequency in an MTF for defocus of the aberration control optical system.

Preferably, it has at least one inflection point in a longitudinal aberration characteristic of the spherical aberration of the aberration control optical system.

Preferably, the aberration control part has the characteristic that the peak position of the modulation transfer function (MTF) for defocus differs depending on the frequency.

Preferably, the peak position of the MTF for defocus of the aberration control optical system is located on a close side at a low frequency side and located on a distant side at a high frequency side.

Preferably, the aberration control optical system includes a stop, and the aberration control element or aberration control plane is arranged in the vicinity of the stop. Alternatively, the aberration control element itself has the function of a stop.

Preferably, an absolute value of a focal length of the lens including the aberration control plane is large relative to the absolute value of the focal length of the entire optical system. Alternatively, the absolute value of the focal length of the aberration control element is large relative to the absolute value of the focal length of the entire optical system.

Preferably, the apparatus has with an image processing part applying image processing to an image signal obtained at the imaging device and improving contrast lowered due to the aberration of the aberration control optical system.

An electronic device of a second aspect of the present invention has an imaging apparatus. The imaging apparatus has an aberration control optical system including a lens and an aberration control part having an aberration control function of generating aberration and an imaging device capturing an image of an object passed through the aberration control optical system, wherein a point spread function (PSF) in the imaging device covers two or more pixels by the aberration control function.

Advantageous Effects

According to the present invention, it is possible to simplify the optical system and possible to reduce the costs, of course, and also possible to extend the depth even without restoration processing, possible to impart sufficient performance with respect to the desired object distance, and possible to obtain good images with a suitable image quality and small influence of noise.

BRIEF DESCRIPTION OF THE DRAWINGS

FIG. 2A to FIG. 2C are views showing spot images on a light receiving surface of an imaging device of the imaging lens apparatus of FIG. 1, in which FIG. 2A is a view showing a spot image in a case where a focal point is deviated by 0.2 mm (defocus=0.2 mm), FIG. 2B is a view showing a spot image in a case of focus (best focus), and FIG. 2C is a view showing a spot image in a case where the focal point is deviated by −0.2 mm (defocus=−0.2 mm).

FIG. 12 A view showing spot images by an optical system in which an absolute value of a focal length of an aberration control plane is smaller than the absolute value of the focal length of the entire optical system.

EXPLANATION OF REFERENCES

200 . . . imaging apparatus, 210 . . . aberration control optical system, 211 . . . first lens, 212 . . . second lens, 213 . . . third lens, 213a . . . aberration control plane, 214 . . . stop, 215 . . . fourth lens, 220 . . . imaging device, 230 . . . analog front end (AFE), 240 . . . image processing apparatus, 250 . . . camera signal processing part, 280 . . . operation part, 290 . . . control device, and MSAR . . . main image plane shift area.

BEST MODE FOR CARRYING OUT THE INVENTION

Below, embodiments of the present invention will be explained with reference to the accompanying drawings.

Figure 3:
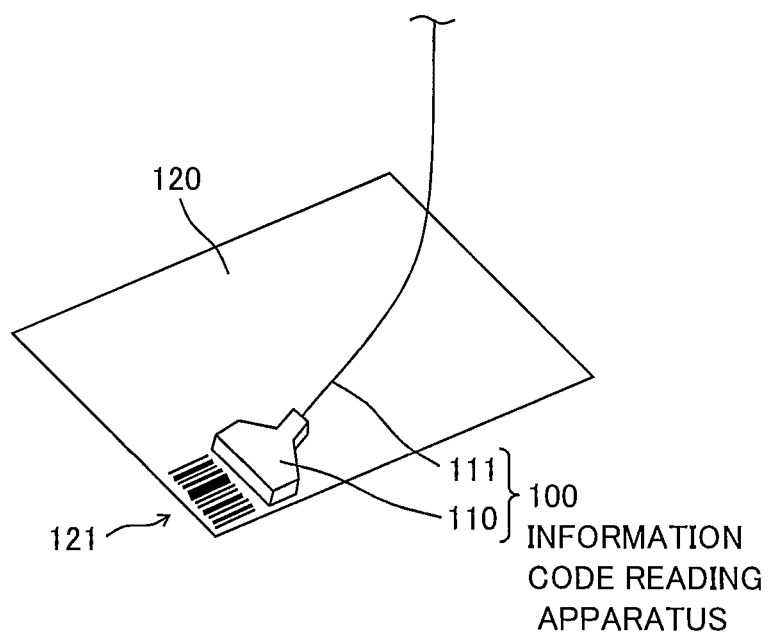
FIG. 3 is a view of the appearance showing an example of an information code reading apparatus according to an embodiment of the present invention.

FIG. 3 is a view of the appearance showing an example of an information code reading apparatus according to an embodiment of the present invention.

Figure 4A:
FIG. 4A to FIG. 4C are views showing examples of the information code.
Figure 4B:
Figure 4C:
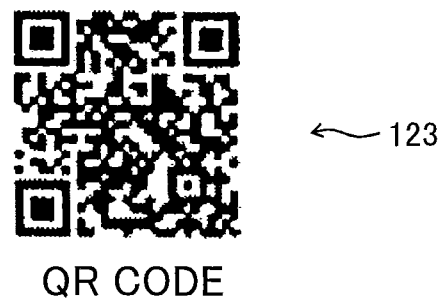

FIG. 4A to FIG. 4C are views showing examples of the information code.

Figure 1:
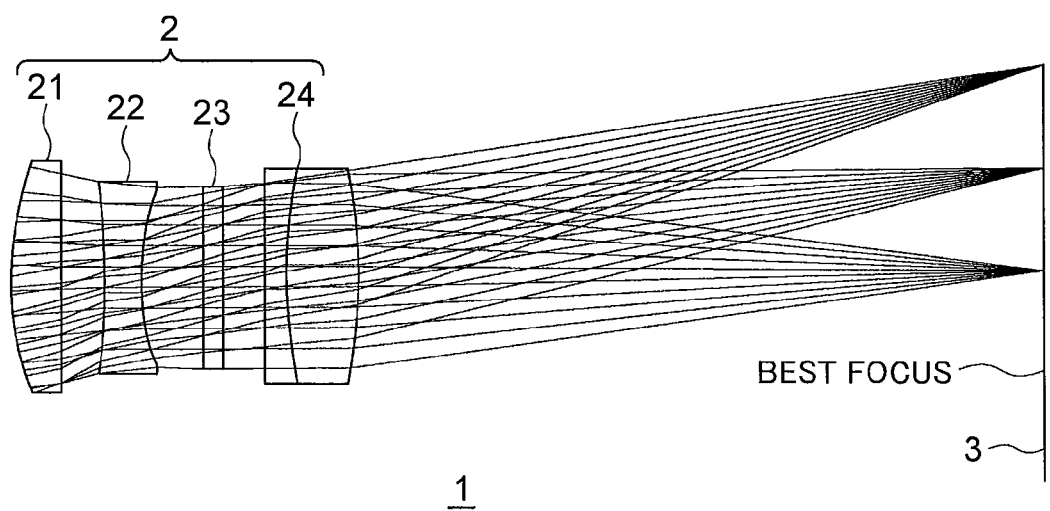
FIG. 1 is a view schematically showing the configuration of a general imaging lens apparatus and a state of light beams.
Figure 2A:
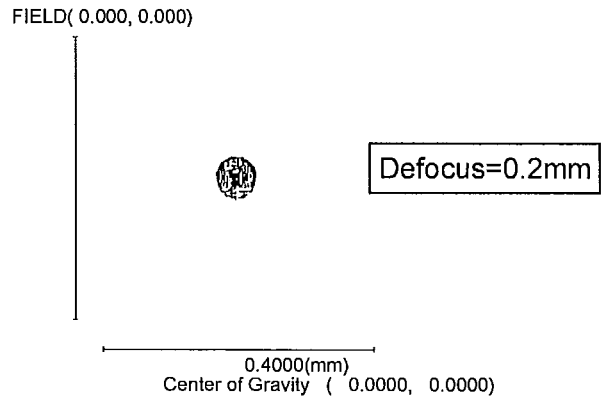
Figure 2B:
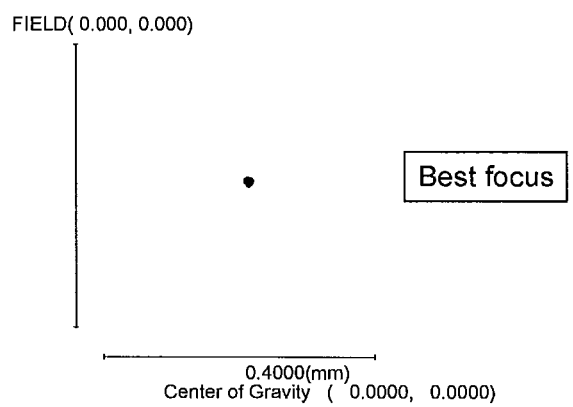
Figure 2C:
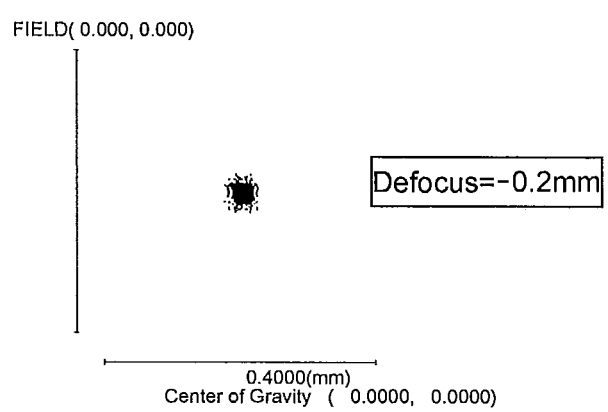
Figure 5:
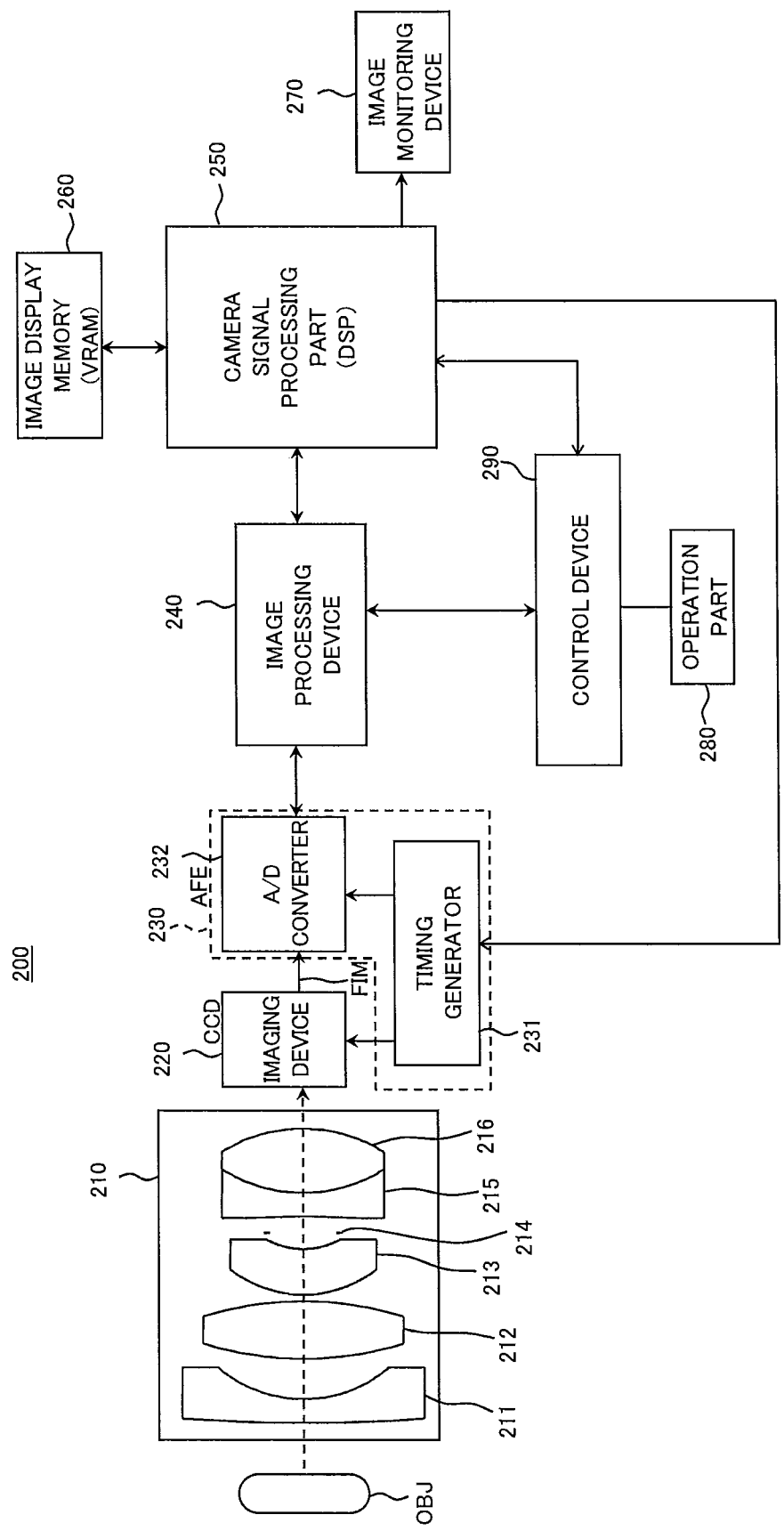
FIG. 5 is a block diagram showing an example of the configuration of an imaging apparatus applied to the information code reading apparatus of FIG. 2.

FIG. 5 is a block diagram showing an example of the configuration of an imaging apparatus applied to the information code reading apparatus of FIG. 2.

Note that, here, the information code reading apparatus is shown as the electronic device to which the imaging apparatus of the present embodiment can be applied.

An information code reading apparatus 100 according to the present embodiment is, as shown in FIG. 3, an apparatus having a body 110 connected through a cable 111 to a not shown electronic register or other processing device and capable of reading an information code 121 such as symbols or codes having different reflection ratios which are printed on for example a read object 120.

As the information code to be read, there can be mentioned, for example, a one-dimensional barcode 122 like a JAN code as shown in FIG. 4A, a stack type CODE 49 as shown in FIG. 4B and FIG. 4C, or a two-dimensional barcode 123 such as a matrix type QR code.

The information code reading apparatus 100 according to the present embodiment has a not shown illumination light source and an imaging apparatus 200 shown in FIG. 5 arranged in the body 110.

The imaging apparatus 200, as will be explained in detail later, applies an aberration control part (aberration control plane or aberration control element) to the optical system, uses the aberration control part to intentionally generate aberration (spherical aberration in the present embodiment), and is configured to have the characteristic of the peak position of the MTF for defocus differing depending on the frequency.

In other words, the imaging apparatus 200 is configured so as to impart not one, but two or more peaks to the main image plane shift area of any frequency in the MTF.

Namely, the imaging apparatus 200 employs a system such as an aberration control optical system enabling extension of the depth while suppressing a fall of the MTF peak value and enables one-dimensional barcodes such as JAN codes, two-dimensional barcodes such as QR codes, and other information codes to be accurately read with a high precision even when image processing of focus restoration is not applied.

The imaging apparatus 200 of the information code reading apparatus 100 has, as shown in FIG. 5, an aberration control optical system 210, imaging device 220, analog front end (AFE) 230, image processing device 240, camera signal processing part 250, image display memory 260, image monitoring device 270, operation part 280, and control device 290.

Figure 6:
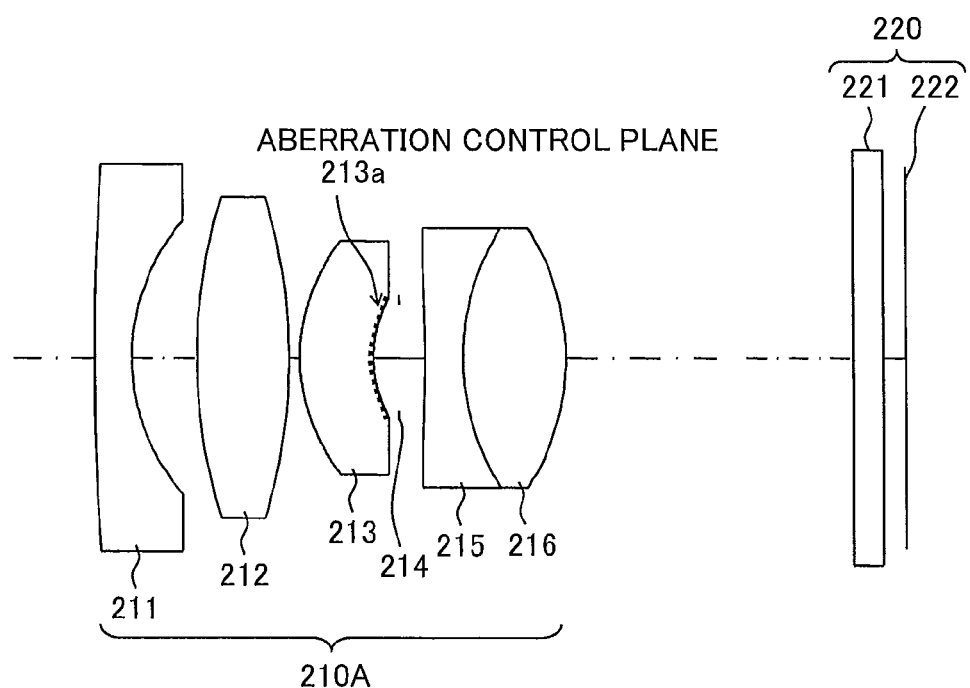
FIG. 6 is a view showing an example of the basic configuration of an imaging lens unit forming an aberration control optical system according to the present embodiment.

FIG. 6 is a view showing an example of the basic configuration of an imaging lens unit forming the aberration control optical system according to the present embodiment.

The aberration control optical system 210A supplies the image capturing the object OBJ to the imaging device 220. Further, in the aberration control optical system 210A, from the object side, a first lens 211, second lens 212, third lens 213, stop 214, fourth lens 215, and fifth lens 216 are sequentially arranged.

The aberration control optical system 210A of the present embodiment has the fourth lens 215 and fifth lens 216 connected to it. Namely, the lens unit of the aberration control optical system 210A of the present embodiment is configured including a joining lens.

Furthermore, the aberration control optical system 210A of the present embodiment is configured as an optical system applying an aberration control plane as an aberration control part having an aberration control function of intentionally generating aberration.

In the present embodiment, in order to generate only spherical aberration, it is necessary to insert an aberration control plane. Note that, in order to reveal the aberration control effect, the aberration control element of another element may be inserted as well.

An example of that becomes as shown in FIG. 6A. The aberration control plane (third lens R2 plane) is included in the usual optical system.

The "aberration control plane" referred to here means a lens surface in which the aberration control effect of the aberration control element is incorporated. Preferably, the aberration control plane 213a is adjacent to the stop 214.

Further, by arranging the aberration control plane in the vicinity of the stop 214 or imparting a stop function to the aberration control plane itself to optimize the aberration control plane, it becomes possible to achieve a uniform image quality in both of the case where the object is reflected at the center of the display plane and the case where it is reflected at the periphery, so a fixed focus lens can be formed with a high performance as the final output image signal of the imaging apparatus.

The aberration control optical system 210A of the present embodiment uses an aberration control optical system including an aberration control plane having an aberration control function to make the PSF cover two or more pixels and is configured as a depth extension optical system having two or more peaks of the MTF characteristic for defocus in a main image plane shift area not causing false resolution at a predetermined frequency.

From another viewpoint, the aberration control optical system 210A of the present embodiment uses the aberration control optical system including an aberration control plane having an aberration control function to extend the depth while raising the OTF of the frequency required for the requested object distance so as to broaden the capturable object distance range. In this case, the aberration control plane has the characteristic of suitably changing the peak position of the MTF for defocus according to the frequency with respect to the requested performance.

In other words, the present embodiment is configured, as explained above, as a depth extension optical system using an aberration control optical system to make the PSF cover two or more pixels and having two or more peaks of the MTF characteristic for defocus in the main image plane shift area not causing false resolution at a predetermined frequency.

In a depth extension optical system using a general optical wavefront modulation function, the depth is extended by extending the skirts of one peak. With this, however, the peak value of the MTF characteristic falls in exchange for that.

In the present embodiment, by using the aberration control function to provide a plurality of peaks, depth extension can be realized while suppressing a fall of the peak value.

By suitably controlling the spherical aberration, the depth can be extended even without image restoration processing.

Specifically, the aberration control optical system 210A of the present embodiment uses the aberration control part (aberration control element or aberration control plane) mainly generating spherical aberration to divide the peak of the MTF for defocus into several peaks (division into two here) so as to extend the depth in the out-of-focus state. Further, in order to divide the peak, an inflection point is imparted to the spherical aberration.

Further, when considered from another viewpoint, as explained before, a general depth extension optical system using an optical wavefront modulation function expands the skirts of one peak in the MTF characteristic to extend the depth. With this, however, the peak values of the MTF characteristics uniformly become low in exchange for that. Accordingly, the image quality greatly deteriorates unless applying image processing of focus restoration.

In the present embodiment, by using the aberration control function to make the peak position of the MTF for defocus have a different characteristic according to the frequency, it becomes possible to impart a sufficient performance for the desired object distance and depth extension can be realized while suppressing a fall of the peak value.

In the same way as explained above, by suitably controlling the spherical aberration, the depth can be extended even without image restoration processing.

In this case, in the aberration control optical system 210A of the present embodiment, by using the aberration control part (aberration control element or aberration control plane) mainly generating spherical aberration to make the peak position of the MTF for defocus differ according to the frequency, it becomes possible to impart a sufficient performance with respect to the desired object distance. Further, in order to make the peak position of the MTF for defocus differ according to the frequency, an inflection point is imparted to the spherical aberration.

Below, the characterizing configuration and functions of this aberration control optical system 210A will be explained in further detail.

Figure 7A:
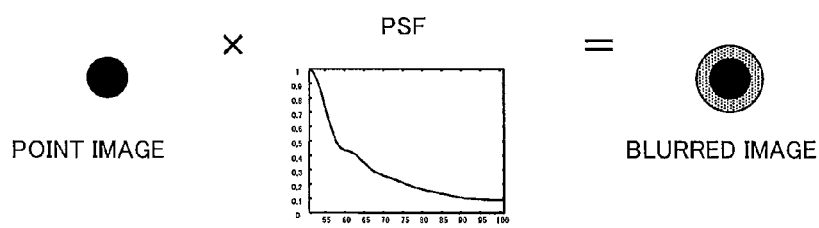
FIG. 7A to FIG. 7C are views for explaining a spherical aberration generation amount of the aberration control optical system according to the present embodiment and views showing relationships between a sensor and a PSF when the imaging device (sensor) is fixed.
Figure 7B:
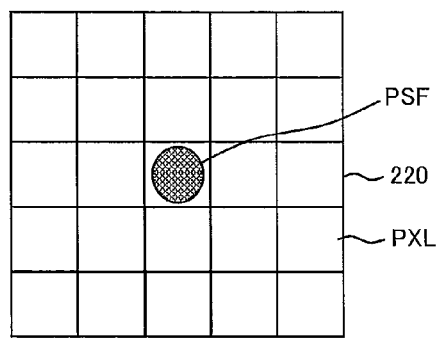
Figure 7C:
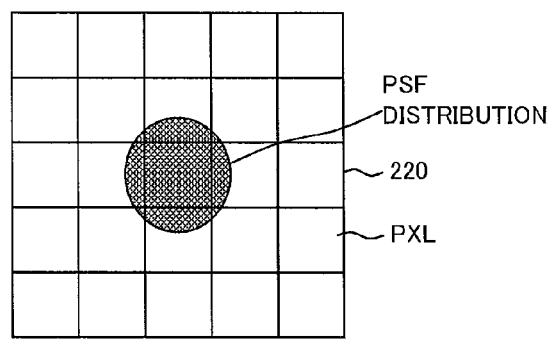
Figure 8A:
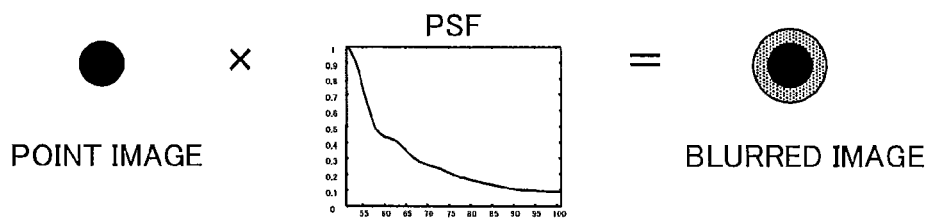
FIG. 8A to FIG. 8C are views for explaining the spherical aberration generation amount of the aberration control optical system according to the present embodiment and views showing relationships between the sensor and the PSF when the aberration control optical system is fixed.
Figure 8B:
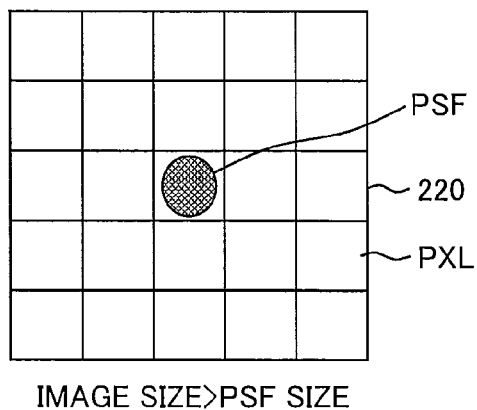
Figure 8C:
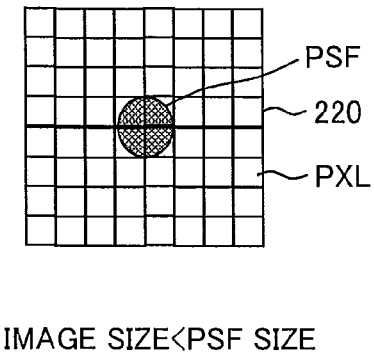

FIG. 7A to FIG. 7C and FIG. 8A to FIG. 8C are views for explaining the amount of generation of spherical aberration of the aberration control optical system according to the present embodiment. FIG. 7A to FIG. 7C show the relationships between the sensor and the PSF when the imaging device (sensor) is fixed, while FIG. 8A to FIG. 8C show the relationships between the sensor and the PSF when the aberration control optical system is fixed.

For example, assume that the imaging device 220 is a sensor having a certain pixel pitch. In that case, in the present embodiment, it is necessary to generate spherical aberration to make the PSF larger than one pixel PXL.

As shown in FIG. 7B and FIG. 8B, even if generating spherical aberration in a size large enough so that the PSF fits in one pixel PXL, the result is the same as the usual optical system. In the usual optical system, generally the size of the center PSF of the focus position becomes the minimum.

Contrary to this, in the aberration control optical system 210A according to the present embodiment, as shown in FIG. 7C, the PSF is controlled to a size whereby not only the out-of-focus state, but also the focus position are not contained in one pixel PXL.

Next, an explanation will be given of selection of an imaging device (sensor) suitable for the aberration control optical system.

For example, assume there is an aberration control optical system having a certain PSF size. As shown in FIG. 8C, preferably a sensor with pixel pitch which is smaller than the size of the PSF is selected.

If one with a pixel pitch larger than the PSF is selected, the optical system becomes the same as usual. The result becomes a focus. Accordingly, in that case, the effect of the spherical aberration of the aberration control optical system cannot be effectively obtained.

Figure 9A:
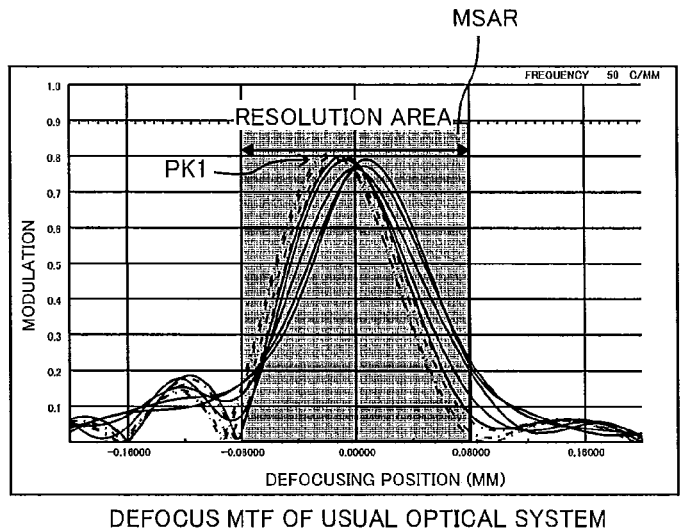
FIG. 9A to FIG. 9C are views showing states of an MTF for defocus of a usual optical system and the aberration control optical system according to the present embodiment.
Figure 9B:
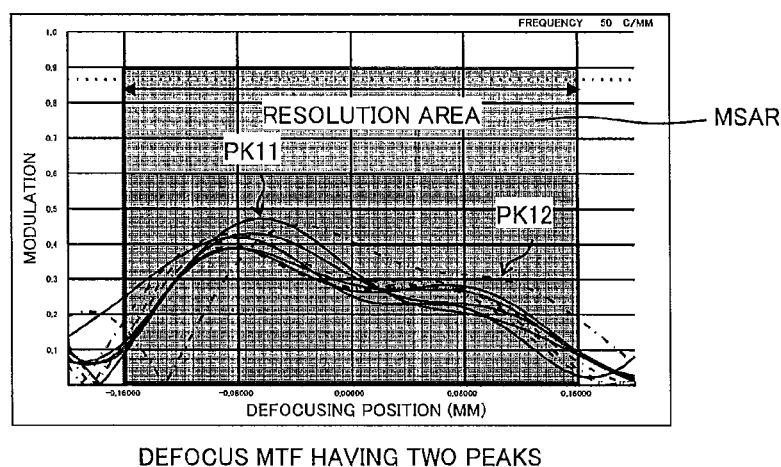
Figure 9C:
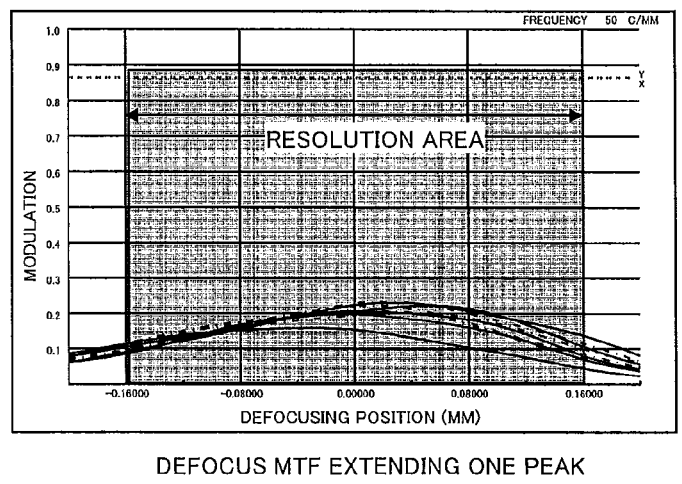

FIG. 9A to FIG. 9C are views showing states of the MTF for defocus of a usual optical system and an aberration control optical system according to the present embodiment.

FIG. 9A shows the state of the MTF for defocus of a usual optical system, FIG. 9B shows the state of the MTF for defocus of an aberration control optical system according to the present embodiment, and FIG. 9C shows the state of the MTF for defocus extending one peak.

In a usual optical system, as shown in FIG. 9A, there is one focus position at the center. The second peaks at the two sides completely fall and invert, so become false resolutions.

For this reason, the resolved region becomes the main image plane shift area MSAR indicated by the hatching. When extending the depth of one peak of the usual optical system, as shown in FIG. 9C, the MTF ends up greatly deteriorated.

Therefore, in the MTF for defocus of the aberration control optical system according to the present embodiment, as shown in FIG. 9B, the one peak PK1 in the usual optical system is divided into the two peaks PK11 and PK12.

Although the MTF is slightly deteriorated, it is learned that the depth is extended to about twice its size by division into two and that further deterioration is suppressed more than when extending the depth of one peak.

FIG. 10A to FIG. 10C and FIG. 11A to FIG. 11C explain that the aberration control optical system of the present embodiment can use a spherical aberration curve to divide the MTF for defocus into two at any frequency.

Figure 10A:
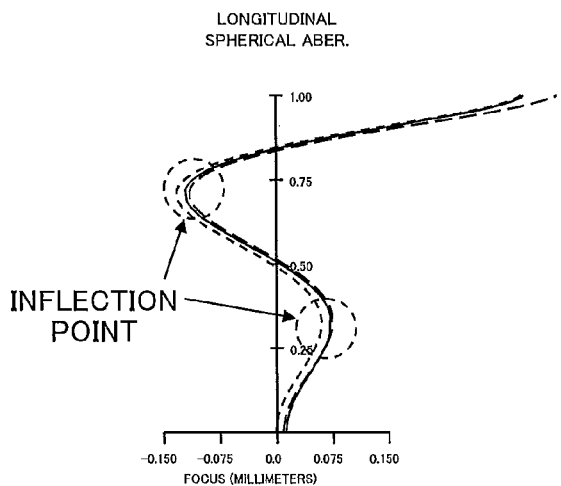
FIG. 10A to FIG. 10C are views showing that the MTF for defocus can be divided into two by any frequency in an aberration control optical system suppressing high frequency OTF fluctuation.
Figure 10B:
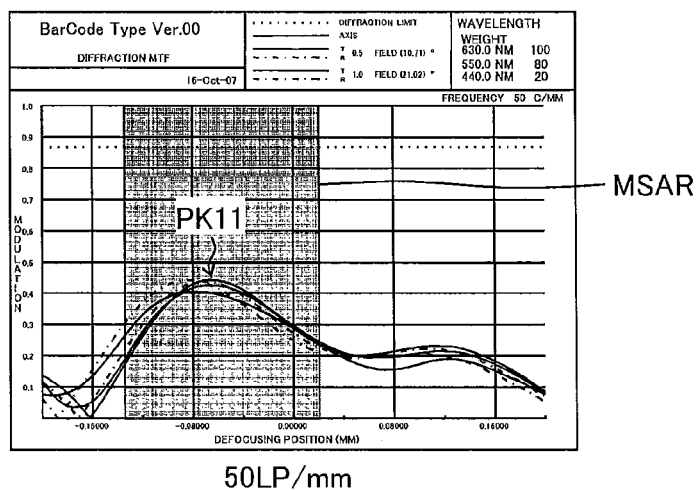
Figure 10C:
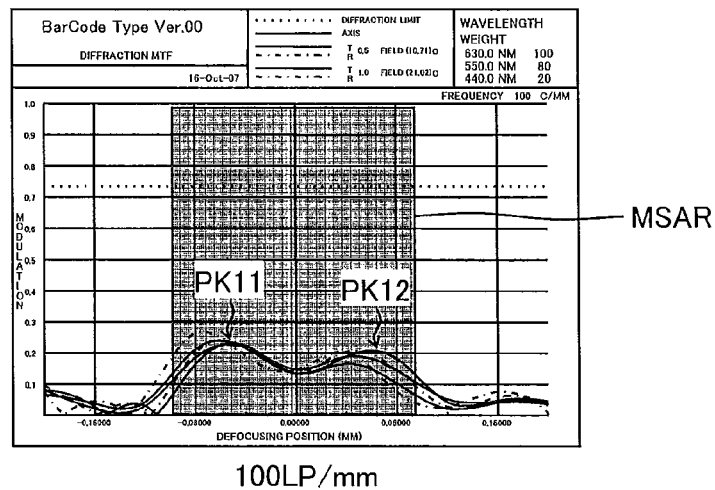

FIG. 10A to FIG. 10C are views showing that an aberration control optical system suppressing OTF fluctuation of a high frequency can divide the MTF for defocus into two at any frequency.

FIG. 10A shows a spherical aberration curve, FIG. 10B shows the state of the peak of the MTF of the main image plane shift area MSAR at a low frequency, while FIG. 10C shows the state of the peak of the MTF of the main image plane shift area MSAR at a high frequency.

Figure 11A:
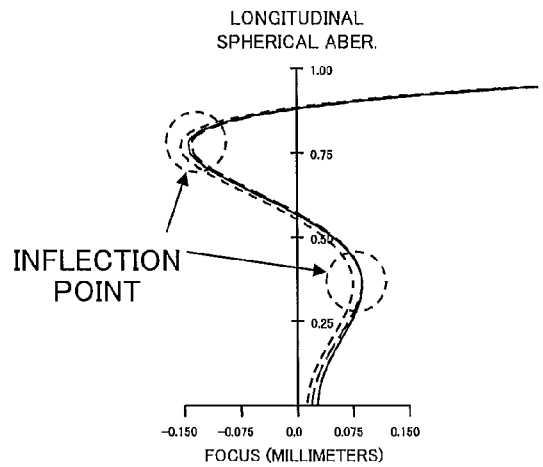
FIG. 11A to FIG. 11C are views showing that the MTF for defocus can be divided into two by any frequency in an aberration control optical system suppressing low frequency OTF fluctuation.
Figure 11B:
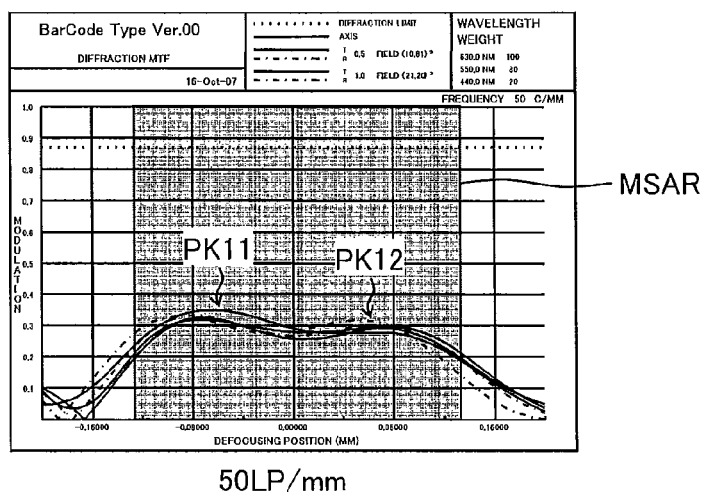
Figure 11C:
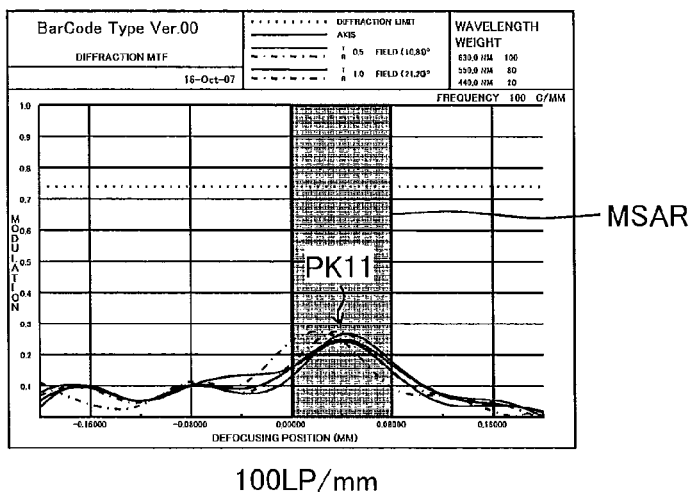

FIG. 11A to FIG. 11C are views showing that an aberration control optical system suppressing OTF fluctuation of a low frequency can divide the MTF for defocus into two at any frequency.

FIG. 11A shows a spherical aberration curve, FIG. 11B shows the state of the peak of the MTF of the main image plane shift area MSAR at a low frequency, and FIG. 11C shows the state of the peak of the MTF of the main image plane shift area MSAR at a high frequency.

As seen from FIG. 11A to FIG. 11C, in order to extend the depth at a low frequency, the amplitude of the spherical aberration may be made larger.

By controlling the magnitude of the amplitude, the defocus MTF at any frequency can be divided into two. That is, the depth at any frequency can be extended.

Further, the aberration control optical system 210A of the present embodiment has the characteristic that the peak position of the MTF for defocus is located at the close side (near distance side) at a low frequency and the peak position of the MTF for defocus is located at the distant side (far distance side) at a high frequency.

By providing an aberration control element (aberration control plane) having this characteristic, it becomes possible to impart a sufficient performance with respect to the desired object distance.

In general, a low frequency is required when the object is close, and a high frequency is required when the object is far. Therefore, when the above aberration control element is used, it becomes possible to improve the performance more.

Here, among the "high frequency" and "low frequency" in the present embodiment, a frequency of half or more of a Nyquist frequency Nf determined from the pixel pitch PTC of the solid imaging device (imaging device 220) used is defined as the high frequency, while a frequency smaller than half of the Nyquist frequency is defined as the low frequency.

Note, the Nyquist frequency Nf is defined as follows.

$$Nf=1/(PTC \times 2)$$

Further, by placing the aberration control element in the vicinity of the stop, it becomes possible to obtain a uniform image quality in both of the case where the object is reflected at the center of the display plane and the case where the object is reflected at the periphery.

Further, by making the peak position of the MTF for defocus differ with respect to the frequency in the entire optical system without the use of an aberration control element, it becomes possible to provide the function of obtaining the required OTF with respect to the requested object distance more than the usual optical system.

Further, in the aberration control optical system 210A of the present embodiment, the absolute value of the focal length of the third lens 213 including the aberration control plane is large relative to the absolute value of the focal length of the entire optical system 210A.

Further, in the present embodiment, the absolute value of the focal length of the aberration control element is large relative to the absolute value of the focal length of the entire optical system 210.

In this way, by making each absolute value of the focal length of the lens including the aberration control plane or the focal length of the aberration control element larger than the absolute value of the focal length of the entire optical system, the influence in the display plane periphery portion of the aberration control plane or aberration control element is reduced, and it becomes possible to obtain a uniform image quality without regard as to the position being the center in the display plane or the periphery.

FIG. 12 is a view showing spot images according to an optical system in which the absolute value of the focal length of the aberration control plane is smaller than the absolute value of the focal length of the entire optical system.

Figure 13:
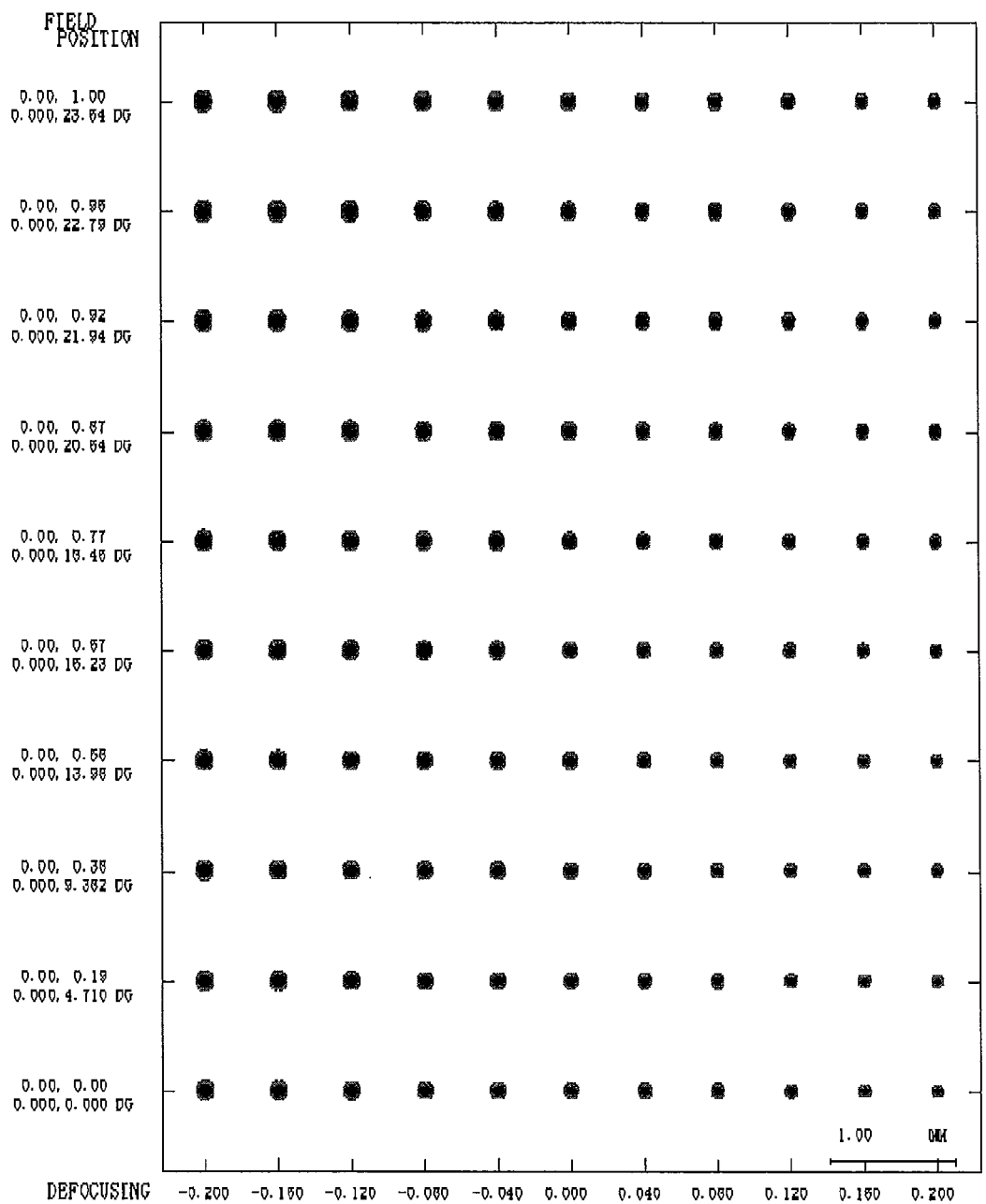
FIG. 13 A view showing spot images by an optical system according to the present embodiment in which the absolute value of the focal length of the aberration control plane is larger than the absolute value of the focal length of the entire optical system.

FIG. 13 is a view showing spot images by an optical system according to the present embodiment in which the absolute value of the focal length of the aberration control plane is larger than the absolute value of the focal length of the entire optical system.

When the absolute value of the focal length of the aberration control plane is smaller than the absolute value of the focal length of the entire optical system, as shown in FIG. 12, there is a large difference of size of the spot images between the center of the display plane and the peripheral portion. Accordingly, in this case, it is hard to obtain a uniform image quality in the entire display plane.

Contrary to this, according to the optical system according to the present embodiment in which the absolute value of the focal length of the aberration control plane is larger than the absolute value of the focal length of the entire optical system, as shown in FIG. 13, the difference of size of the spot images between the center of the display plane and the peripheral portion is small. Accordingly, in the present embodiment, a uniform image quality is obtained in the entire display plane without regard as to the position being the center in the display plane or the periphery.

An explanation was given above of the characteristic configuration, function, and effects of the optical system according to the present embodiment.

Below, an explanation will be given of the configurations and functions of the other components such as the imaging device and image processing part.

In the imaging element 220, for example, as shown in FIG. 6A, from the fifth lens 216 side, a parallel flat plate (cover glass) 221 made of glass and an imaging surface 222 of the imaging device configured by a CCD or CMOS sensor etc. are arranged in that order.

The light from the object OBJ through the aberration control optical system 210A is focused onto the imaging surface 222 of the imaging device 220.

Note that, the dispersed image of the object captured by the imaging device 220 is an image which is not focused on the imaging device 220 due to the aberration control plane 213a, but has light beams with a deep depth and a blurred portion.

Further, as shown in FIG. 5, at the imaging element 220, an image captured by the aberration control optical system 210 is imaged. The imaged first order image information is output as a first order image signal FIM of an electric signal through the analog front end 230 to the image processing device 240.

As explained above, the imaging device 220 is configured by a CCD or CMOS sensor etc. In FIG. 5, the imaging device 220 is described as a CCD as one example.

The analog front end 230 has a timing generator 231 and an analog/digital (A/D) converter 232.

The timing generator 231 generates a drive timing of the imaging device 220 configured by a CCD or the like. The A/D converter 232 converts an analog signal input from the imaging device 220 to a digital signal and outputs this digital signal to the image processing device 240.

The image processing device 240 receives as input the digital signal of the captured image output from the front stage AFE 230, applies edge enhancement or other image processing to this to improve the contrast lowered due to the aberration of the aberration control optical system 210, and outputs the result to the later stage camera signal processing part (DSP) 250.

The camera signal processing part (DSP) 250 performs color interpolation, white balancing, YCbCr conversion processing, compression, filing, and other processing on the input image signals, stores the image signals after processing into the image display memory 260, displays the image on the image monitoring device 270, and so on.

The control device 290 has the function of controlling exposure and the function of inputting operations from the operation part 280 etc., determines the operation of the entire system in accordance with those inputs, controls the AFE 230, image processing device 240, camera signal processing part 250, stop 214, etc., and conducts the arbitration control of the entire system.

Below, a concrete explanation will be given of the configurations and functions of the optical system and image processing device of the present embodiment.

In the present embodiment, the aberration control optical system is employed and it is possible to obtain a high definition image quality. In addition, the optical system can be simplified, and it becomes possible to reduce the costs.

The image processing device 240, as explained above, receives the first order image signal FIM from the imaging device 220, applies edge enhancement or other image processing to this, improves the contrast which lowered due to the aberration of the aberration control optical system 210A or other processing, and forms a high definition final image FNLIM.

Figure 14:
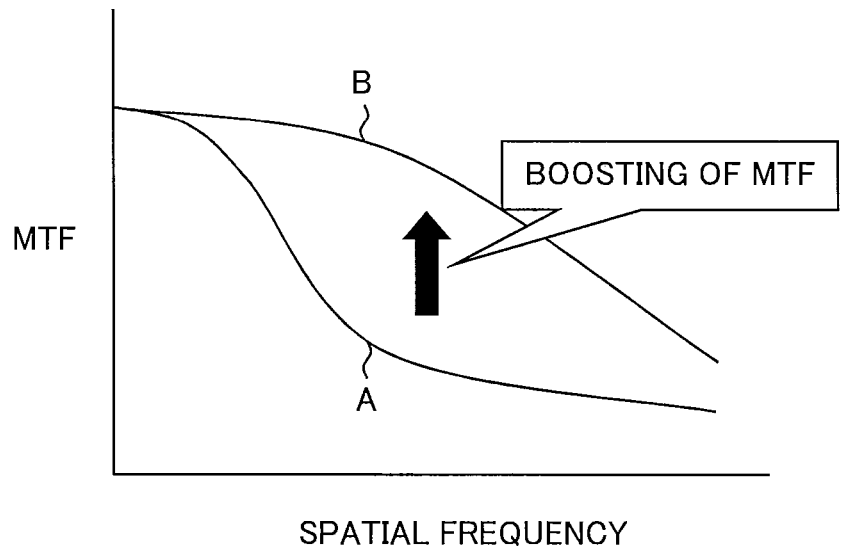
FIG. 14 is a view for explaining MTF correction processing in an image processing apparatus according to the present embodiment.

The MTF correction processing of the image processing device 240 performs corrections so that, for example, as indicated by a curve A in FIG. 14, the MTF of the first order image which essentially has become a low value approaches (reaches) the characteristic indicated by a curve B in FIG. 14 by post-processing such as edge enhancement and chroma enhancement using the spatial frequency as a parameter.

The characteristic indicated by the curve B in FIG. 14 is the characteristic obtained in the case where the aberration control part (aberration control plane or aberration control optical element) is not used like in for example the present embodiment.

Note that, all corrections in the present embodiment are according to the parameters of the spatial frequencies.

Figure 15:
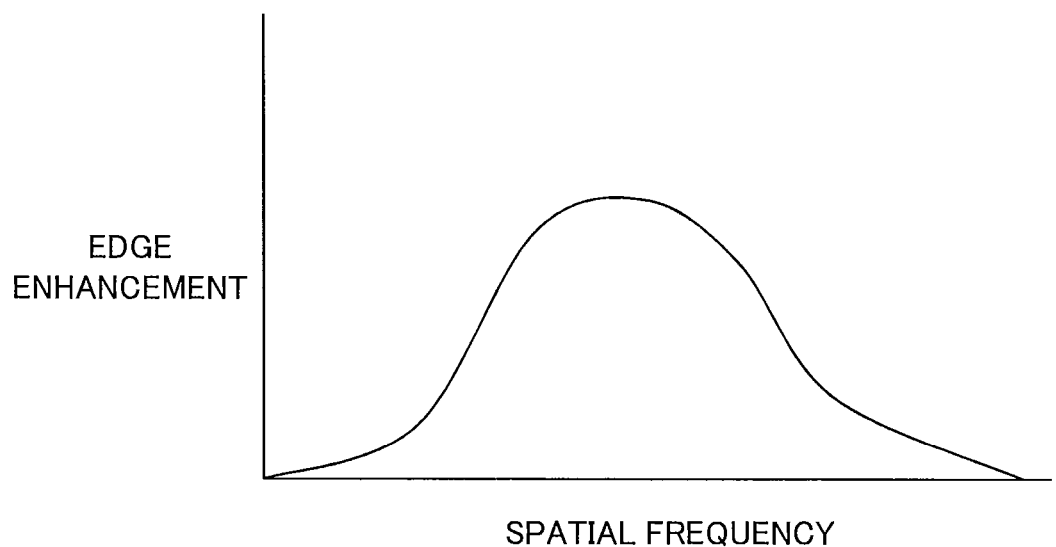
FIG. 15 is a view for specifically explaining the MTF correction processing in the image processing apparatus according to the present embodiment.

In the present embodiment, as shown in FIG. 14, in order to achieve the MTF characteristic curve B desired to be finally realized from the MTF characteristic curve A for the optically obtained spatial frequency, the strength of the edge enhancement etc. is adjusted for each spatial frequency as shown in FIG. 15 to correct the original image (first order image).

For example, in the case of the MTF characteristic of FIG. 14, the curve of the edge enhancement with respect to the spatial frequency becomes as shown in FIG. 15.

Namely, by performing the correction by weakening the edge enhancement on the low frequency side and high frequency side within a predetermined bandwidth of the spatial frequency and strengthening the edge enhancement in an intermediate frequency zone, the desired MTF characteristic curve B is virtually realized.

In this way, the imaging apparatus 200 according to the embodiment is basically an image forming system configured by the aberration control optical system 210 and imaging device 220 forming the first order image and the image processing device 240 forming the first order image to a high definition final image, wherein an aberration control element is newly provided in the optical system or a glass, plastic, or other optical element with a surface formed for aberration control use is provided to thereby intentionally generate spherical aberration and form an image on the imaging surface (light receiving surface) of the imaging device 220 formed by a CCD or CMOS sensor and wherein the formed first order image is passed through the image processing device 240 to obtain a high definition image.

In the present embodiment, the first order image from the imaging device 220 is made a light beam condition with a very deep depth. For this reason, the MTF of the first order image essentially becomes a low value. The MTF thereof is corrected by the image processing device 240.

Next, responses of the MTF in the present embodiment and the usual optical system will be considered.

Figure 16:
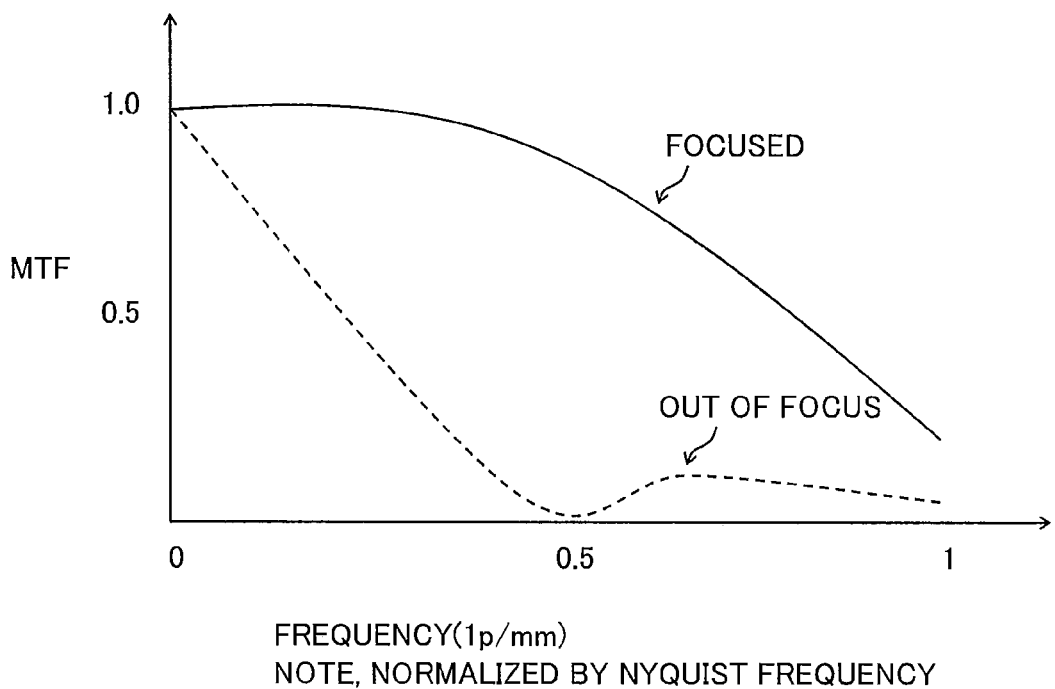
FIG. 16 is a view showing responses of the MTF at the time when an object exists at the focus position and the time when it is out of the focus position in the case of the usual optical system.

FIG. 16 is a view showing the responses of the MTF at the time when the object is at the focus position and the time when it is at a position out of focus in the case of the usual optical system.

Figure 17:
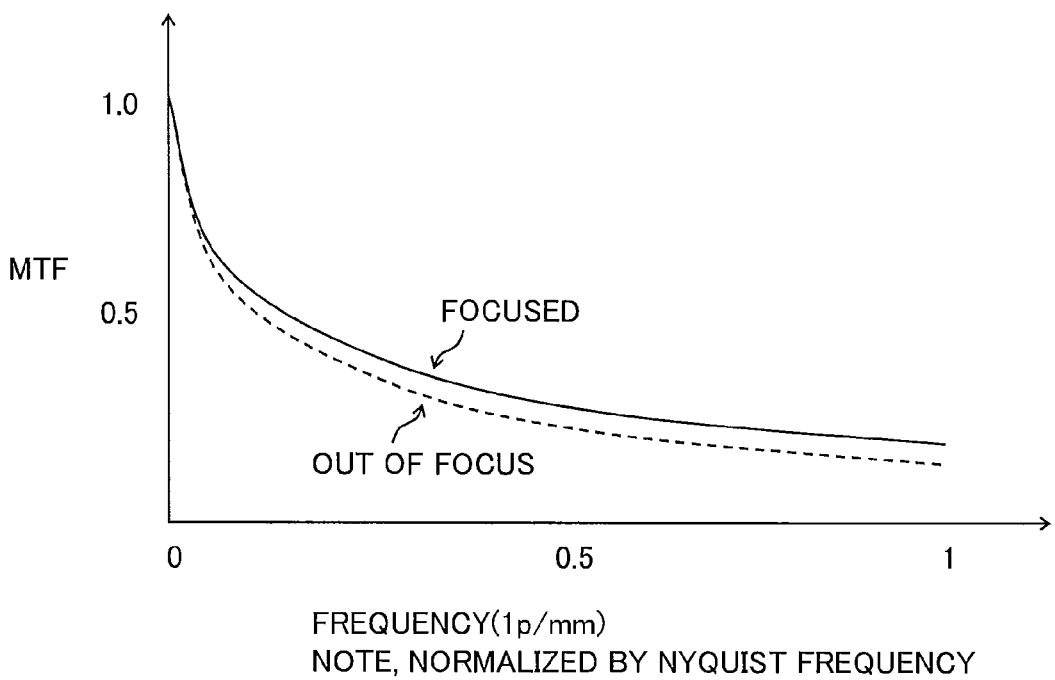
FIG. 17 is a view showing responses of the MTF at the time when the object exists at the focus position and the time when it is out of the focus position in the case of the optical system of the present embodiment having an aberration control element.

FIG. 17 is a view showing the responses of the MTF at the time when the object is at the focus position and the time when it is at a position out of focus in the case of the optical system of the present embodiment having the aberration control element.

Figure 18:
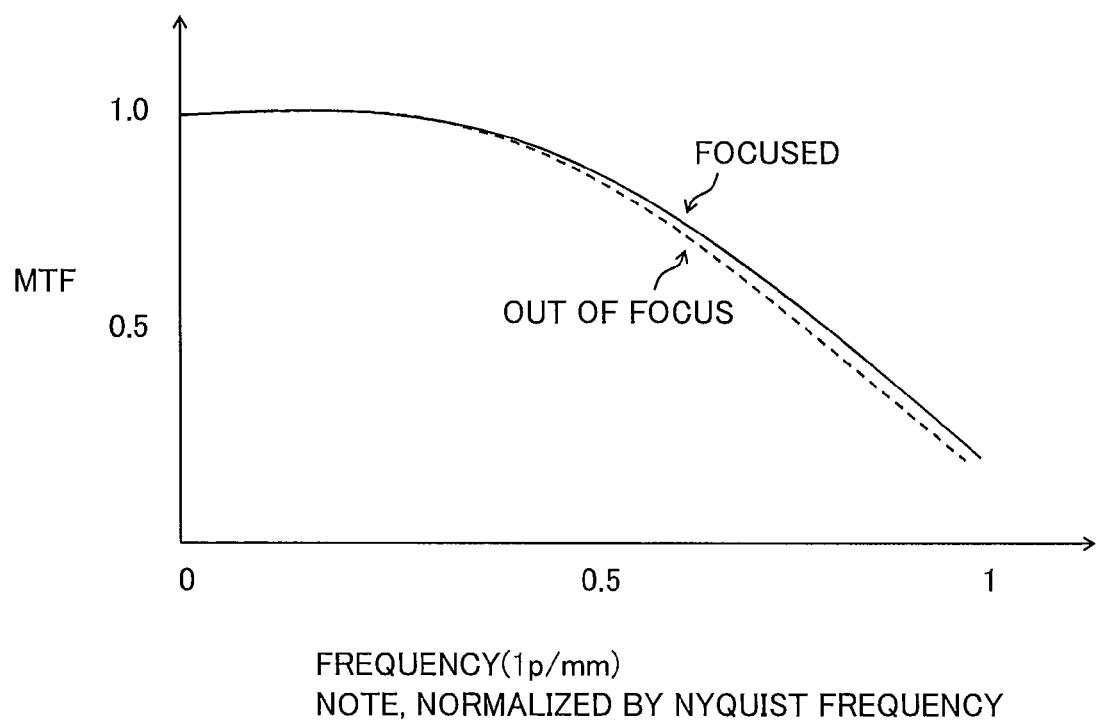
FIG. 18 is a view showing responses of the MTF after the image processing of the imaging apparatus according to the present embodiment.

Further, FIG. 18 is a view showing the responses of the MTF after the image processing of the imaging apparatus according to the present embodiment.

As seen from these views as well, in the case of an optical system having an aberration control part (aberration control plane or aberration control element), even when the object is at a position out of focus, the change of the response of the MTF becomes smaller than that in an optical system in which an aberration control part (aberration control plane or aberration control element) is not inserted.

By processing the image formed by this optical system by the later stage image processing device 240, the response of the MTF can be improved.

However, when noise would end up increasing if image processing were carried out, preferably it is also possible not to perform such image processing to improve the response of the MTF.

As explained above, an optical system intentionally generating aberration in accordance with the object is called as an "aberration control optical system".

The absolute value (MTF) of the OTF of the aberration control optical system shown in FIG. 17 is preferably 0.1 or more at the Nyquist frequency.

This is because, in order to achieve the OTF after restoration shown in FIG. 18, the gain is raised by the image processing, but the noise of the sensor is simultaneously raised. For this reason, preferably the image processing is carried out while suppressing a rise of the gain as much as possible at a high frequency near the Nyquist frequency.

In the case of the usual optical system, the image is resolved when the MTF at the Nyquist frequency is 0.1 or more.

Accordingly, if the MTF before the image processing is 0.1 or more, it is not necessary to raise the gain at the Nyquist frequency by the image processing. If the MTF before the image processing is less than 0.1, the image after the image processing becomes an image greatly influenced by noise, so this is not preferred.

As explained above, the present embodiment includes the aberration control optical system 210 and imaging device 220 having the aberration control function of intentionally generating aberration and the image processing device 240 forming the first order image to a high definition final image.

The aberration control optical system 210A is formed as a depth extension optical system using an aberration control optical system including an aberration control part having an aberration control function of intentionally generating aberration so as to make the PSF cover two or more pixels and having two or more peaks of the MTF characteristic for defocus in the main image plane shift area not causing false resolution at a predetermined frequency.

Accordingly, according to the present embodiment, the following effects can be obtained.

In the present embodiment, by using the aberration control function to provide two or more peaks in the MTF characteristic for defocus, the depth can be extended more than a general optical system not having an aberration control element while suppressing a fall of the peak value.

Namely, according to the present embodiment, by suitably controlling the spherical aberration, the depth can be extended even when image restoration processing is not applied, and it becomes possible to obtain an image with a suitable image quality and a small influence of noise.

Further, in the present embodiment, each absolute value of the focal length of the lens including the aberration control plane or the focal length of the aberration control element is larger than the absolute value of the focal length of the entire optical system, therefore there are the advantages that the influence at the aberration control plane or at the display plane peripheral portion of the aberration control element can be reduced and that a uniform image quality is obtained in the entire display plane without regard as to if the position is at the center in the display plane or the periphery.

Further, according to the present embodiment, the aberration control optical system 210A has the characteristic that the peak position of the MTF for defocus differs according to the frequency. Further, the aberration control optical system 210A has the characteristic that the peak position of the MTF for defocus is located at the close side (near distance side) at a low frequency and that the peak position of the MTF for defocus is located on the distant side (far distance side) at a high frequency.

Accordingly, according to the present embodiment, it becomes possible to impart a sufficient performance with respect to the desired object distance. The depth extension can be realized while suppressing a fall of the peak value.

As a result, by suitably controlling the spherical aberration, the depth can be extended even when image restoration processing is not applied.

Namely, as explained above, according to the present embodiment, by suitably controlling the spherical aberration, the depth can be extended even when image restoration processing is not applied, so it becomes possible to obtain an image with a suitable image quality and with a small influence of noise.

Further, by placing the aberration control element in the vicinity of the stop, it becomes possible to obtain a uniform image quality in both of the case where the object is reflected at the center of the display plane and the case where the object is reflected at the periphery.

Further, by making the peak position of the MTF for defocus differ with the frequency in the entire optical system without using an aberration control element, it becomes possible to provide a mode of operation where a required OTF is obtained with respect to the desired object distance better than the usual optical system.

Further, there are the advantages that a natural image can be obtained without requiring an optical lens which is difficult to make, is expensive, and is large size and without driving the lens.

Further, the imaging apparatus 200 according to the present embodiment can be used for an optical system of a digital camera, camcorder, or other consumer electronic device in which smaller size, lighter weight, and cost must be considered.

Further, the configuration of the aberration control optical system 210 can be simplified, production becomes easy, and the costs can be reduced.

Note that, as the electronic device to which the imaging apparatus 200 according to the present embodiment can be applied, a digital camera, a camcorder, a scanner, or other consumer electronic device, an image inspection system or other industrial equipment or other electronic image apparatus or system can be exemplified.

The invention claimed is:

1. An imaging apparatus comprising:
   an aberration control optical system including a lens and an aberration control part having an aberration control function of generating aberration; and
   an imaging device configured to capture an image of an object passed through the aberration control optical system;
   wherein a point spread function (PSF) in the imaging device covers two or more pixels by the aberration control function; and
   wherein the aberration control function includes a function of dividing a peak of the modulation transfer function (MTF) for defocus into two or more peaks in a main image plane shift area (MSAR) at any frequency in the MTF for defocus of the aberration control optical system.

2. The imaging apparatus of claim 1, wherein the aberration control function includes a function of generating spherical aberration and extending the depth.

3. The imaging apparatus of claim 1, wherein the aberration control function includes a function of generating spherical aberration and imparting at least one inflection point in a longitudinal aberration characteristic of the spherical aberration of the aberration control optical system in order to divide the peak of the MTF into two or more peaks.

4. The imaging apparatus of claim 1, wherein the aberration control part has the characteristic that the position of a peak of the MTF for defocus differs depending on the frequency.

5. The imaging apparatus of claim 4, wherein the position of the peak of the MTF for defocus of the aberration control optical system is located on a close, near distance side at a low frequency and located on a far distance side at a high frequency.

6. The imaging apparatus of claim 1, wherein the aberration control optical system includes a stop, and the aberration control element or aberration control plane is arranged in the vicinity of the stop.

7. The imaging apparatus of claim 1, wherein the aberration control element itself has the function of a stop.

8. The imaging apparatus of claim 1, wherein an absolute value of a focal length of the lens including the aberration control plane is large relative to the absolute value of the focal length of the entire optical system.

9. The imaging apparatus of claim 1, wherein the absolute value of the focal length of the aberration control element is large relative to the absolute value of the focal length of the entire optical system.

10. The imaging apparatus of claim 1, wherein the apparatus has an image processing part applying image processing to an image signal obtained at the imaging device and improving contrast lowered due to the aberration of the aberration control optical system.

11. An electronic device including an imaging apparatus, the imaging apparatus comprising:
    an aberration control optical system including a lens and an aberration control part having an aberration control function of generating aberration; and
    an imaging device configured to capture an image of an object passed through the aberration control optical system;
    wherein a point spread function (PSF) in the imaging device covers two or more pixels by the aberration control function; and
    wherein the aberration control function includes a function of dividing a peak of the modulation transfer function (MTF) for defocus into two or more peaks in a main image plane shift area (MSAR) at any frequency in the MTF for defocus of the aberration control optical system.

12. The electronic device of claim 11, wherein the device has at least one inflection point in a longitudinal aberration characteristic of the spherical aberration of the aberration control optical system.

13. The electronic device of claim 11, wherein the aberration control part has the characteristic that the peak position of the modulation transfer function (MTF) for defocus differs depending on the frequency.

14. The electronic device of claim 13, wherein the peak position of the MTF for defocus of the aberration control optical system is located on a close side at a low frequency side and located on a distant side at a high frequency side.

* * * * *